United States Patent [19]
McKinney

[11] Patent Number: 5,670,038
[45] Date of Patent: Sep. 23, 1997

[54] LIQUID FILTER SYSTEM

[76] Inventor: Jerry L. McKinney, P.O. Box 546, Silsbee, Tex. 77656

[21] Appl. No.: 524,334

[22] Filed: Sep. 6, 1995

[51] Int. Cl.$^6$ ............................................. B01D 21/24
[52] U.S. Cl. .................... 210/98; 210/97; 210/106; 210/111; 210/257.1; 210/340; 210/341; 210/202; 210/760; 210/758; 210/195.1
[58] Field of Search .................... 210/97, 98, 106, 210/111, 257.1, 195.1, 760, 758, 340, 341, 202, 709

[56] References Cited

U.S. PATENT DOCUMENTS

| | | | |
|---|---|---|---|
| 3,291,562 | 12/1966 | Anderson | 210/340 |
| 3,447,684 | 6/1969 | Morrison | 210/340 |
| 3,478,883 | 11/1969 | Deluca, Jr. | 210/108 |
| 3,715,416 | 2/1973 | Campbell et al. | 210/340 |
| 3,819,053 | 6/1974 | Milotich | 210/108 |
| 4,128,477 | 12/1978 | Nebolsine | 210/709 |
| 4,155,850 | 5/1979 | Rathbone et al. | 210/98 |
| 5,380,427 | 1/1995 | Foss | 210/201 |

OTHER PUBLICATIONS

Figure 2 demonstrating solenoid–actuated automatic filter backwash, GEOFLOW, Inc., Apr. 26, 1993.

Primary Examiner—Ana Fortuna
Attorney, Agent, or Firm—Vaden, Eickenroht & Thompson, L.L.P.

[57] ABSTRACT

A filter system for a liquid, usually water, is disclosed. The system includes two filters, each having a housing and a filter medium located in the housing through which the liquid flows in one direction to be filtered. A pressure operated distributing valve alternates the flow of water from one to the other of the filters and pressure regulators and check valves or pressure regulators alone divert a portion of the filtered water to backwash the filter medium in the other filter.

22 Claims, 5 Drawing Sheets

LIQUID FILTER SYSTEM

This invention relates to liquid filter systems generally, and in particular, to liquid filter systems that include two filters, one of which is backwashed while the other filters the liquid.

The filter system of this invention has utility in any system where solid particles need to be separated from a liquid, but is particularly useful in reducing the Biochemical Oxygen Demand (BOD) of the effluent from a waste water treatment plant, such as a septic tank. Thus, by filtering out of the effluent a large percentage of the solids, the BOD can be reduced without having to treat the effluent with chemicals, such as chlorine or other oxidizing agents to lower the BOD. But even if filtering won't lower the BOD to an acceptable level, it will substantially reduce the amount of oxidizing agents required to reach an acceptable level.

Drip irrigation systems using buried lines are being used more and more to dispose of waste water effluent. In drip irrigation, the water lines are equipped with emitters spaced about 24" apart through which water is supplied to the ground in a controlled amount. For example, two standard flow rates are 0.65 gallons per hour per emitter or 1.15 gallons per hour per emitter depending upon the circumstances. Generally, the pressure in the water lines of the system is maintained at 20 psi to produce the flow rates mentioned above through the emitters. At that pressure, the maximum length of each run of irrigation pipe is 300 ft. for the 0.65 gph emitter and 210 ft. for the 1.15 gph emitter.

Any small particles in the water reaching the emitters will tend to plug the openings in the emitters over time. For example, effluent from septic tanks is one source of water for underground drip irrigation, but since it usually contains solids, it cannot be allowed to flow directly into streams and underground water. Therefore, it is extremely important that the water introduced into this type of irrigation system be filtered to remove such particles before they reach the emitters. Sand filters are used to filter the water, as are woven wire filter screens that are made out of stainless steel and have three standard mesh in microns, 50, 100, and 150.

A wire mesh screen, sand filter, or disc filter will tend to plug up over time as particles collect on the filter media. Therefore, they require backwashing periodically.

Therefore, it is an object of this invention to provide a liquid filter system comprising two filter assemblies, each filter assembly having a housing, a cylindrical filter screen mounted in the housing with an annular space between the filter and the housing, a liquid inlet in one end of the housing through which the liquid enters the screen where a portion of the liquid is filtered through the walls of the screen into the annular space, an outlet in the side of the housing through which the filtered liquid flows out of the housing, an outlet in the other end of the housing through which unfiltered liquid flows out of the housing, a flow line connecting the filtered liquid outlets of both filter assemblies to a common filtered liquid line, a pressure regulator in the common filtered liquid flow line to limit the pressure of the filtered liquid provided by the system, and a restriction in the second outlet in the housing of each filter screen assembly to restrict the flow of unfiltered liquid from each filter assembly to maintain the pressure of the filtered liquid sufficient for a portion of the filtered liquid to flow into the annular space between the filter screen and the housing of the second filter assembly to backwash the filter screen in the second filter screen assembly, and means for alternating the flow of liquid to the two filter screen assemblies to alternately backwash the filter screen of one filter screen assembly as the other filter screen assembly is filtering the liquid.

It is a further object of this invention to provide such a system in which the means for alternating the flow of liquid to the filter screen assemblies comprises a diverting valve actuated by stopping and starting the flow of liquid to the valve.

It is a further object of this invention to provide such a system in which the means for alternating the flow of liquid to the filter screen assemblies includes separate flow lines to each filter screen assembly, valves in each flow line, and means to alternately opening one valve and closing the other.

It is a further object and feature of this invention to provide a filter system for non-potable water that includes two separate filters that are connected in the system in such a manner that while one filter is filtering particles out of the water, the other filter is being backwashed with a portion of the filtered water. As a result, by periodically switching the flow of water from one filter to the other filter, the filters are always relatively clean of debris and therefore the system will operate at maximum efficiency.

A further object and feature of this invention is to provide such a filter system that can cause the flow to be switched from one filter to the other by a timer or by a float valve in the vessel from which the water is being pumped.

It is a further object and advantage of this invention to provide a waste water treatment system that includes two filter assemblies for removing solids from the waste water, each assembly including a housing and a wire mesh screen having a cylindrical wall which filters solids out of the waste water as the water flows through wire mesh cylindrical wall of each screen into the annulus between the screen and the housing, a flow line from each filter housing through which a portion of the filtered water flows alternately through a check valve to a pressure regulator that reduces the pressure of the filtered water to the pressure desired for an underground drip irrigation system and the remaining portion of the filtered water flows through a second pressure regulator to the annulus of the non-filtering filter to backwash the cylindrical wire mesh screen of that filter.

It is a further object and feature of this invention to provide such a system when the flow of the filtered water to the irrigation system and to the non-filtering filter is controlled by check valves.

It is a further object and feature of this invention to provide an improved sewage treatment system including a septic tank for receiving the sewage initially and which through bacterial action reduces the BOD of the effluent as it leaves the tank, the improvement comprising a filter system downstream of the tank through which the effluent flows to filter a sufficient amount of solids out of the effluent to reduce the BOD of the effluent, the filter system comprising two filter assemblies, each having a housing and a cylindrical filter screen that filters the effluent as it flows through the wall of the screen into an annulus between the screen and the housing, a distributing valve assembly for alternating the flow of effluent from one to the other of the filter assemblies, an effluent discharge line connected to each filter assembly, a first pressure regulator in the line to the irrigation system to create a back pressure in the effluent discharge line from the filters, and a second pressure regulator arranged to lower the pressure of a portion of the effluent from the filtering filter to a pressure below the collapsing pressure of the filter screens and check valves arranged to direct the flow from the second pressure regulator through the filter screen of the non-filtering filter and backwash the non-filtering filter screen.

It is a further object and feature of this invention to provide a filter system for use with a waste water treatment plant comprising two filters, each filter having a housing, a filter screen mounted in the housing to provide a space between the filter and the housing, an inlet in one end of the housing through which water enters the screen and is filtered through the walls of the screen into the annular space, a filtered water outlet in the housing, a second outlet in the other end of the housing through which unfiltered water flows out of the housing, a flow line connecting the filtered water outlets of both filters together and to a common filtered water line, a pressure regulator in the common filtered water flow line to limit the pressure of the filtered water provided by the system, and a restriction in the second outlet in the housing of the first filter to restrict the flow of unfiltered water from the first filter to maintain the pressure of the filtered water sufficient for a portion of the filtered water to flow into the annular space between the filter screen and the housing of the second filter to backwash the filter screen in the second filter, and means for alternating the flow of water to the filters to alternately backwash each filter as the other is filtering the waste water.

It is a further object and feature of this invention to provide an improvement in a sewage treatment system that includes a septic tank for receiving the sewage initially and that through bacterial action reduces the BOD of the effluent as it leaves the tank, the improvement comprising a filter system downstream of the tank through which the effluent flows to filter a sufficient amount of solids out of the effluent to reduce the BOD of the effluent to an acceptable amount, the filter system comprising two filters, each having a housing and a filter medium located in the housing through which the effluent flows in one direction to be filtered before discharging the final treated effluent, a distributing valve assembly for alternating the flow of effluent from one to the other of the filters, an effluent discharge line connected to each filter to carry filtered effluent to a line connected to the irrigation system, a pressure regulator in the line to the irrigation system to create a back pressure in the line from the filters to cause a portion of the effluent from the filtering filter to flow through the filter medium of the non-filtering filter and backwash the non-filtering filter.

It is also an object of this invention to provide such a sewage treatment system that includes a second tank downstream of the septic tank and upstream of the filter that contains an oxidizing agent to further reduce the BOD in the effluent upstream of the filter.

It is a further object and feature of this invention to provide a filter system for use with a waste water treatment plant to reduce the solids in and the BOD of the effluent from the plant comprising two filters, each filter having a housing, a filter screen mounted in the housing to provide a space between the filter and the housing, an inlet in one end of the housing through which water enters the screen and is filtered through the walls of the screen into the annular space, a filtered water outlet in the housing, a second outlet in the other end of the housing through which unfiltered water flows out of the housing, a flow line connecting the filtered water outlets of both filters together and to a common filtered water line, a pressure regulator in the common filtered water flow line to limit the pressure of the filtered water provided by the system, and a pressure regulator in the second outlet in the housing of the first filter to restrict the flow of unfiltered water from the first filter to maintain the pressure of the filtered water sufficient for a portion of the filtered water to flow into the annular space between the filter screen and the housing of the second filter to backwash the filter screen in the second filter, and means for alternating the flow of water to the filters to alternately backwash each filter as the other is filtering the waste water to reduce the solids in and the BOD of the effluent which can be supplied to an underground drip irrigation system.

It is a further object and feature of this invention to provide an improved sewage treatment system including a septic tank for receiving the sewage initially and which through bacterial action reduces the BOD of the effluent as it leaves the tank, the improvement comprising a filter system downstream of the tank through which the effluent flows to filter solids out of the effluent to reduce the BOD of the effluent, the filter system comprising two filter assemblies, each having a housing and a filter medium located in the housing through which the effluent flows in one direction to be filtered, a distributing valve assembly for alternating the flow of effluent from one to the other of the filter assemblies, an effluent discharge line connected to each filter assembly, a pressure regulator in the line to the irrigation system to create a back pressure in the effluent discharge line from the filters to cause a portion of the effluent from the filtering filter to flow through the filter medium of the non-filtering filter and backwash the non-filtering filter.

It is a further object and feature of this invention to provide in a sewage treatment system including a septic tank that receives the sewage initially and that through bacterial action reduces the BOD of the effluent as it leaves the tank, the improvement comprising a filter system downstream of the tank through which the effluent flows to filter a sufficient amount of solids out of the effluent to reduce the BOD of the effluent, the filter system comprises two filters, each filter having a housing, a filter screen mounted in the housing to provide a space between the filter and the housing, an inlet in one end of the housing through which effluent from the septic tank enters the screen and is filtered through the walls of the screen into the space between the filter and the housing, a filtered effluent outlet in the side of the housing, a second outlet in the housing through which unfiltered effluent flows out of the housing, a flow line connecting the filtered effluent outlets of both filters together and to a common filtered effluent flow line, a pressure regulator in the common filtered effluent flow line to reduce the pressure of the filtered effluent discharged from the system, and a pressure regulator in the second outlet in the housing of the first filter to restrict the flow of unfiltered effluent from the first filter to maintain the pressure of the filtered effluent sufficient for a portion of the filtered effluent to flow into the annular space between the filter screen and the housing of the second filter to backwash the filter screen in the second filter, and a distributing valve for alternating the flow of effluent to the filters.

It is a further object of this invention to provide such a sewage treatment system further including an underground drip irrigation system into which the effluent from the system flows.

These and other objects, advantages, and features of this invention will be apparent to those skilled in the art from a consideration of this specification including the attached drawings and appended claims.

Figure 1:
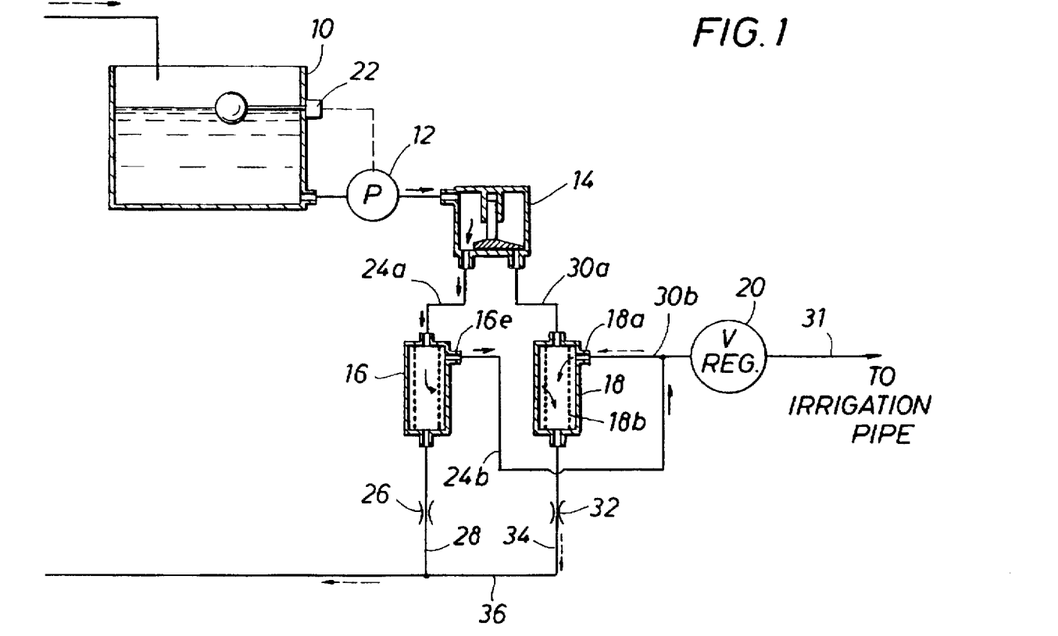
FIG. 1 is a schematic view of the system in operation with the filter on the left-hand side filtering the water while the filter on the right-hand is being backwashed.
Figure 2:
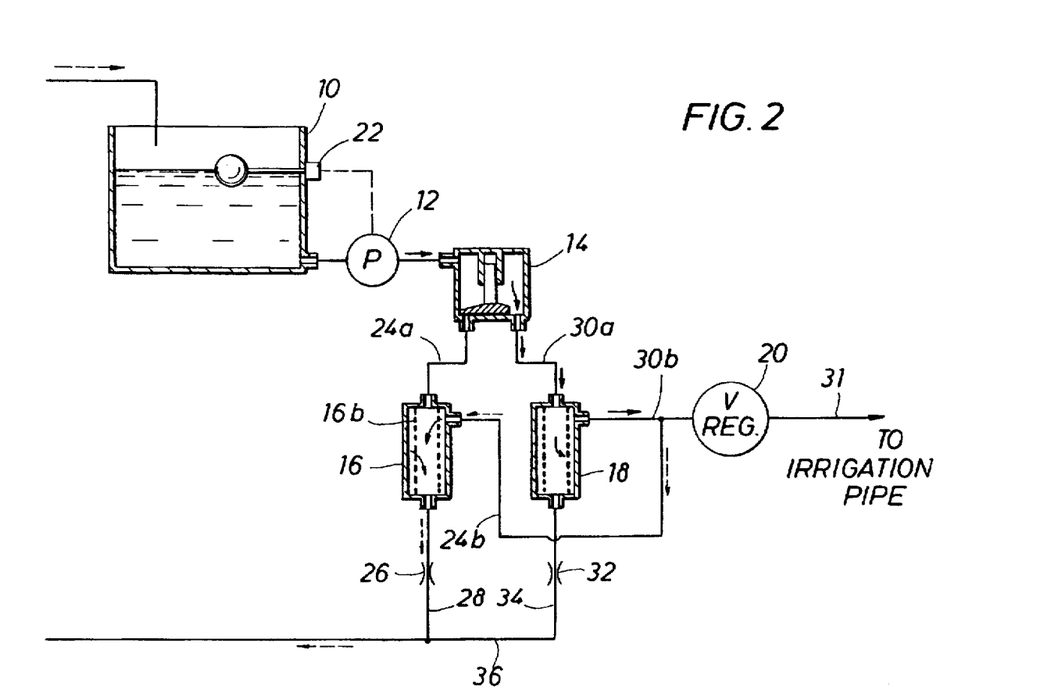
FIG. 2 is a schematic of the system in FIG. 1 with the filter on the right-hand side filtering the water while the filter on the left-hand side is being backwashed.
Figure 3:
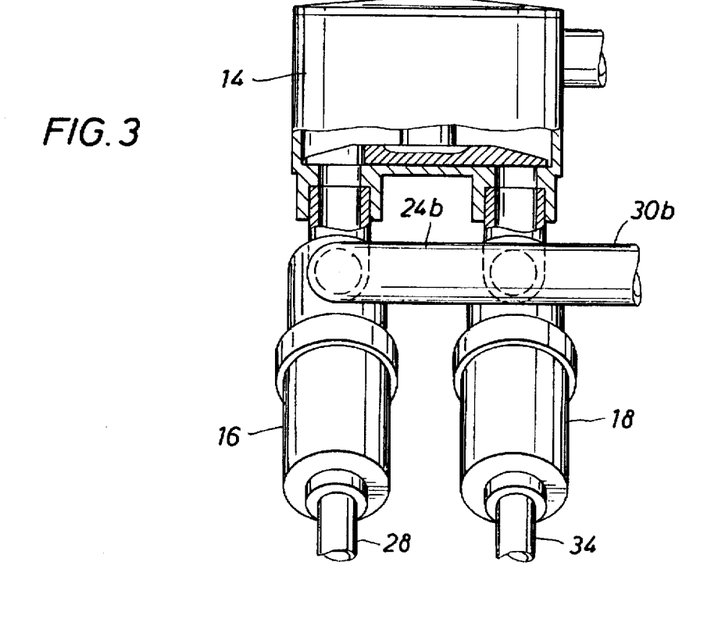
FIG. 3 is a view partly in section and partly in elevation of the filter system of FIGS. 1 and 2.

The system shown in FIGS. 1 and 2 include settling or dosing tank 10, pump 12, distributing valve 14, filters 16 and 18, and pressure regulator 20. Pump 12 is turned on and off by float valve 22. When it is turned on, the pump will supply water from tank 10 to distributing valve 14. This valve is designed so that by stopping the flow of water from pump 12 intermittently, the valve will alternate the flow of water to filters 16 and 18. In FIG. 1, the distributing valve is directing water to filter 16. When the pump is shut down by the float valve, the next time it starts up the distributing valve will direct water to filter 18 as shown in FIG. 2. In the drawings, float valve 22 is used to turn pump 12 on when the water level rises to a preselected level in tank 10 and turns the pump off when the water level drops to a preselected level. A timer could be used to turn the pump on and off and alternate the flow between the two filters as long as a supply of water is available.

Figure 4:
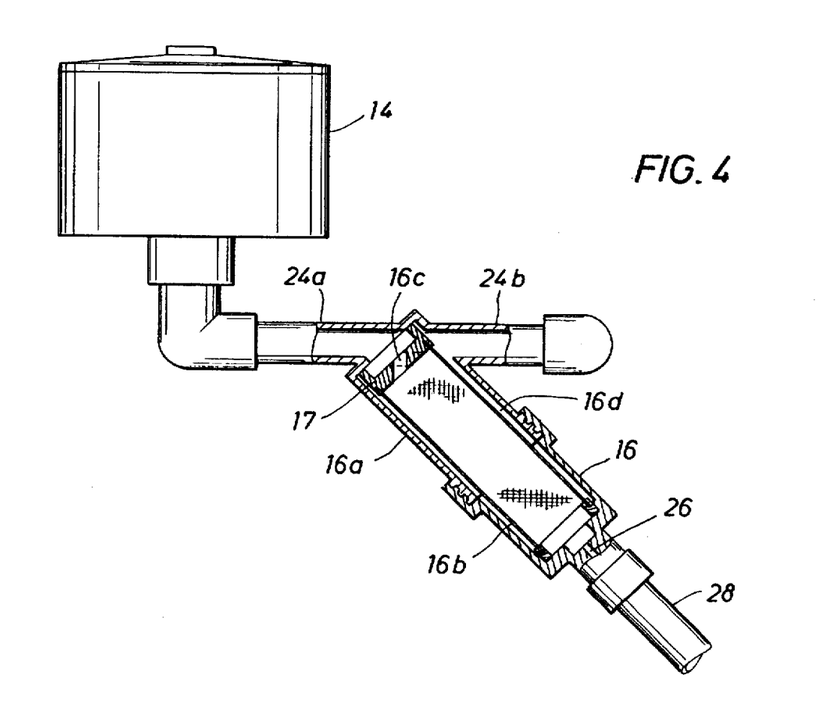
FIG. 4 is a side view of the system in FIG. 3 with one filter being shown partly in section.

Filters 16 and 18 are shown in section schematically in FIGS. 1 and 2. Filter 16 is shown in section in greater detail in FIG. 4. Filter 16 includes housing 16a and internal cylindrical wire mesh screen 16b. Water enters the screen from conduit 24a through a plurality of inclined openings in end wall 17, one of which is shown in FIG. 4 and is indicated by the number 16c. The inclined openings cause the incoming water to swirl around the inside of wire mesh screen 16b and wash debris downwardly toward the lower end of the screen. The water is filtered as it passes through the screen into annulus 16d. The filtered water flows through outlet 16e to conduit 24b.

Orifice 26 in the lower end wall of the filter housing allows some of the water to flow out of the filter unfiltered. A pressure regulator or a flow restricting valve could be used in place of the orifice. This water flows back to tank 10 or, if the system is filtering effluent from a waste water treatment plant such as a septic tank, then back to the inlet of the system to be recycled through the waste water plant. Orifice 26 maintains sufficient water pressure in the filter to force a portion of the water through the screen into annulus 16d and into flow line 24b with sufficient pressure and volume to backwash filter 18 and supply a sufficient volume of water to the irrigation system. Orifice 32 provides an outlet for the water that is backwashing filter 18. Orifices 26 and 32 are shown in FIGS. 1 and 2 schematically.

The filtered water from filter 16 flows through conduit 24b to conduit 30b, which is connected to outlet 18a of filter 18, and to irrigation pipe 31 through pressure regulator 20. The pressure regulator drops the pressure to the desired pressure to be maintained in the drip irrigation system, usually about 20 psi. As a result of the pressure drop across the pressure regulator, a portion of the filtered water will flow into filter 18 through outlet 18a and backwash screen 18b of filter 18 as described above. The debris washed off the screen by the backwash water is carried out of the lower end of the filter through choke or orifice 32 into conduit 34. Conduit 34 is connected to conduit 36 which carries the backwashed water back to the waste water treatment plant to be reprocessed.

In FIG. 2, pump 12 has been shut down and then restarted and consequently distributing valve 14 directs the water from pump 12 into filter 18 through conduit 30a. Filtered water from filter 18 travels through conduit 30b through pressure regulator 20 to the irrigation pipe and, as described above, a portion of the filtered water travels through conduit 24b back to filter 16 and backwashes screen 16b of that filter.

Figure 5:
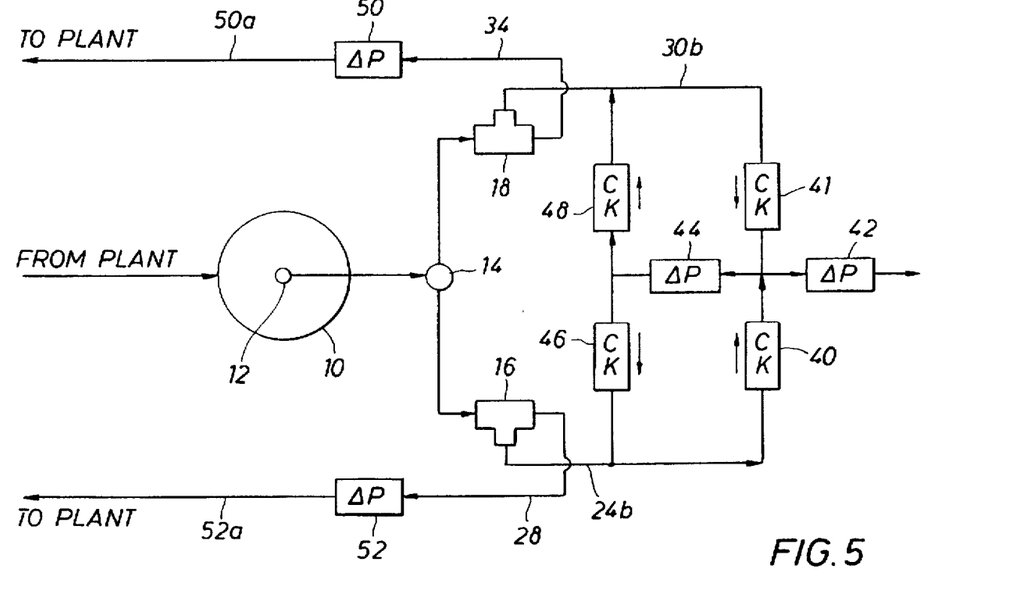
FIGS. 5 and 6 are flow diagrams of the system of this invention showing how each filter is backwashed alternately with a portion of the filtered water from the other filter using a pressure operated diverter valve, four check valves, and four pressure regulators.
Figure 6:
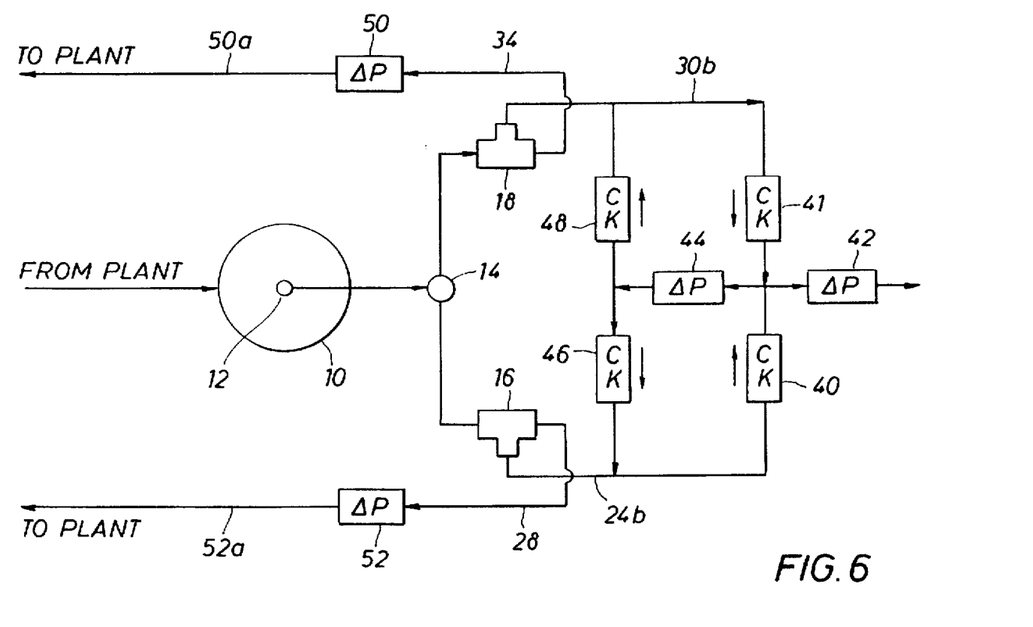

FIGS. 5 and 6 are schematic diagrams of a complete system for filtering water from a waste water treatment plant for distribution to an irrigation system such as a drip irrigation system. The system employs pressure operated distributing valve 14 to divert the effluent pumped from dosing tank 10 by pump 12 alternately to filters 16 and 18. The flow of the filtered water and non-filtered water is controlled by a combination of pressure regulators and check valves. In FIG. 5, filter 16 is filtering water from distributing valve 14. Filtered water exits filter 16 through line 24b, passes through check valve 40 and supplies filtered water to the irrigation system through pressure control valve 42 and backwash water for filter 18 through pressure control valve 44. Pressure control valve 42 reduces the pressure of the water to a level that will cause the emitters to supply the desired flow of water to the ground, usually 20 psi. Pressure control valve 44 reduces the pressure to 15 psi or less to avoid collapsing the wire mesh screen in filter 18. The backwash water does not flow through check valves 41 and 46 because the pressure in line 24b is higher than the pressure in line 30b. The backwash water returns to the waste water treatment plant through pressure regulator 50 and line 50a, which maintains a back pressure on line 34 to help reduce the pressure drop across the screen. Pressure regulator 50 also serves to limit the volume of water returned to the waste water treatment plant so that the volume of water entering the plant does not exceed its capacity.

In FIG. 6, filter 18 is filtering water for irrigation and for backwashing the screen in filter 16, and pressure control valve 52 is controlling the pressure drop across the screen in filter 16 in addition to the volume of water returned to the plant through line 52a.

Figure 7:
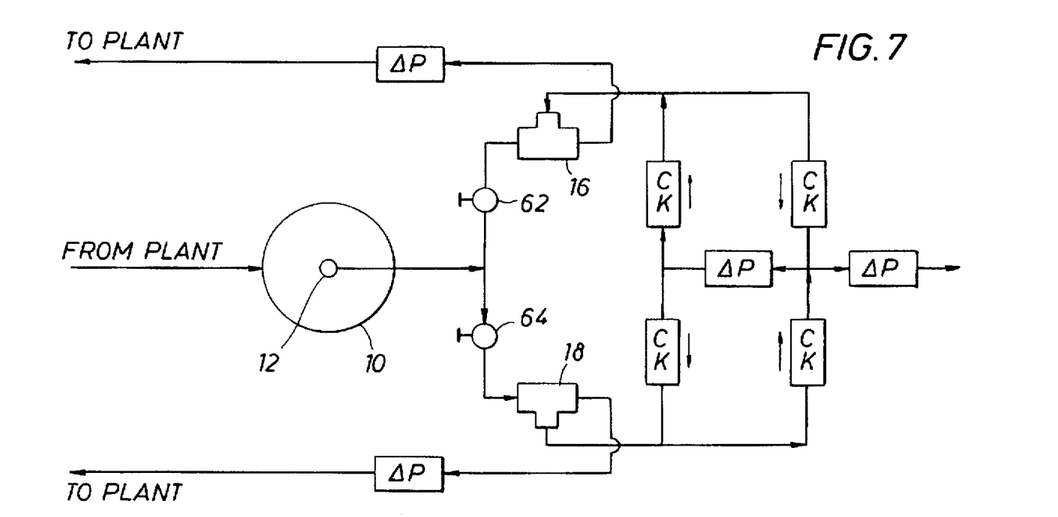
FIG. 7 is a flow diagram of the system of FIG. 6 where the pressure operated flow diverter is replaced with two motor valves.
Figure 8:
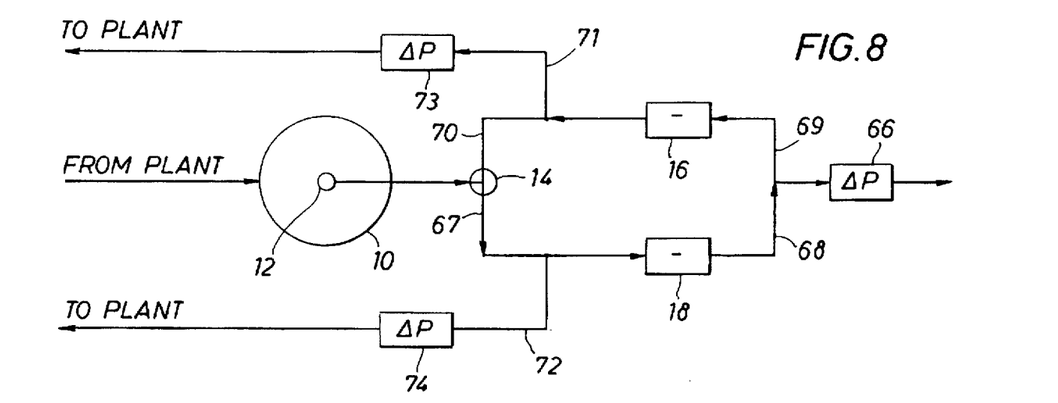
FIG. 8 and FIG. 9 are flow diagrams of a system that uses a pressure operated diverting valve and four pressure regulators to alternately filter through one filter and backwash the other.
Figure 9:
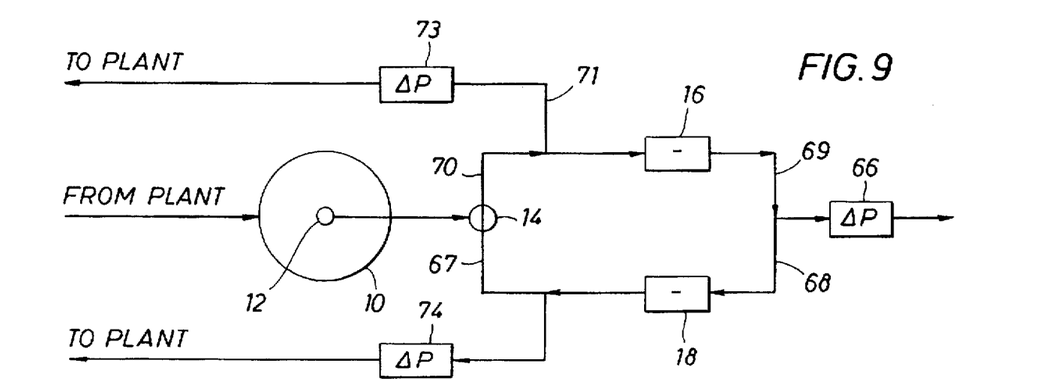

FIGS. 7, 8, and 9 are three different plumbing arrangements. In FIG. 7 motor valves 62 and 64 control the flow of water to filters 16 and 18 from dosing tank 10 instead of the distributing valve described above. The rest of the plumbing functions as described above for FIGS. 5 and 6.

FIGS. 8 and 9 illustrate a system of alternating the flow of effluent through two filters so that one filter is filtering while a portion of the filtered water backwashes the other filter using only two pressure regulators, which can be automatic or manually controlled.

In FIG. 8, effluent is being pumped from dosing tank 10 by pump 12. The effluent is diverted from filter 16 or 18 by diverting valve 14. In FIG. 8, effluent flowing through line 67 is being filtered by filter 18, which can be any suitable filter such as a sand filter or a disc filter or the filter shown in FIGS. 1-4.

Pressure regulator 66 reduces the pressure of the filtered water from filter 18 that flows to the irrigation system. The reduction of pressure also reduces the volume flowing through the regulator causing some of the filtered water to backwash filter 16 through line 69. The backwash water cannot flow through line 70 because diverting valve 14 is closed to that line so this water flows back to the water treatment plant through line 71 and pressure regulator 73. Pressure regulator 73 controls the pressure drop of the backwash water through filter 16. Pressure regulator 74 also serves to control the pressure in the system by controlling the pressure drop across filter 18 and to limit the volume of water that is returned to the treatment plant through line 71.

In FIG. 9, the direction of the water from the diverting valve is reversed as are the functions of the components.

Figure 10:
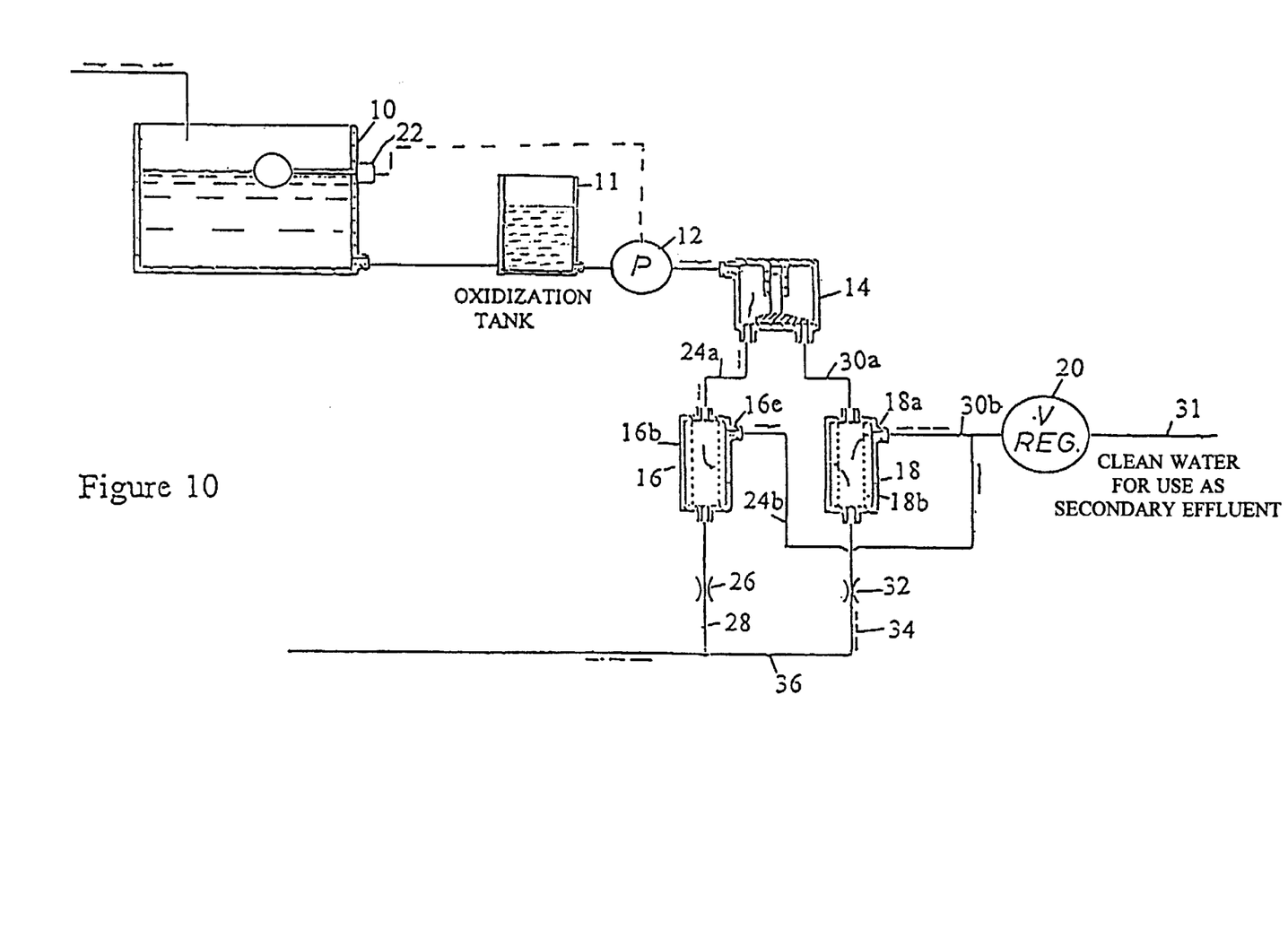
FIG. 10 is a schematic view of the system in FIG. 1 showing a preferred embodiment which includes a second tank between the dosing tank and the filters that serves to add chlorine or other oxidizing agents to the effluent before the effluent is filtered.

FIG. 10 shows another preferred embodiment of the invention where second tank 11 is placed downstream of the septic tank and upstream of the filter. Tank 11 contains an oxidizing agent such as chlorine, or ozone, to further reduce the biochemical oxygen demand (BOD) levels in the effluent such that the release of the effluent will not cause a reduction of oxygen in the surroundings. The oxidizing agent serves to "burn" the waste as it chemically reacts to oxidize the sludge, thus reducing particulate matter contacting the filter and lowering BOD levels upon emission.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A liquid filter system comprising two filter assemblies, each filter assembly having a housing, a cylindrical filter screen mounted in the housing with an annular space between the filter and the housing, a liquid inlet in one end of the housing through which the liquid enters the screen where a portion of the liquid is filtered through the walls of the screen into the annular space, an outlet in the side of the housing through which the filtered liquid flows out of the housing, a second outlet at the other end of the housing through which unfiltered liquid flows out of the housing, a flow line connecting the filtered liquid outlets of both filter assemblies to a common filtered liquid line, a pressure regulator in the common filtered liquid flow line to limit the pressure of the filtered liquid provided by the system, and a restriction in the second outlet in the housing of each filter screen assembly to restrict the flow of unfiltered liquid from each filter assembly to maintain the pressure of the filtered liquid sufficient for a portion of the filtered liquid to flow into the annular space between the filter screen and the housing of the second filter assembly to backwash the filter screen in the second filter screen assembly, and means for alternating the flow of liquid to the two filter screen assemblies to alternately backwash the filter screen of one filter screen assembly as the other filter screen assembly is filtering the liquid.

2. The system of claim 1 in which the backwash liquid is returned to the system upstream of the filter screen assemblies.

3. The system of claim 1 in which the filtered liquid is non-potable water from a sewage treatment plant.

4. The system of claims 1, 2 or 3 in which the means for alternating the flow of liquid to the filter screen assemblies comprises a diverting valve actuated by stopping and starting the flow of liquid to the valve.

5. The system of claims 1, 2 or 3 in which the means for alternating the flow of liquid to the filter screen assemblies includes separate flow lines to each filter screen assembly, valves in each flow, and means to alternately open one valve and close the other.

6. A liquid filter system for use with a waste water treatment plant comprising two filters, each filter having a housing, a filter screen mounted in the housing to provide a space between the filter and the housing, an inlet in one end of the housing through which water enters the screen and is filtered through the walls of the screen into the annular space, a filtered water outlet in the housing, a second outlet in the other end of the housing through which unfiltered water flows out of the housing, a flow line connecting the filtered water outlets of both filters together and to a common filtered water line, a pressure regulator in the common filtered water flow line to limit the pressure of the filtered water provided by the system, and a restriction in the second outlet in the housing of the first filter to restrict the flow of unfiltered water from the first filter to maintain the pressure of the filtered water sufficient for a portion of the filtered water to flow into the annular space between the filter screen and the housing of the second filter to backwash the filter screen in the second filter, and means for alternating the flow of water to the filters to alternately backwash each filter as the other is filtering the waste water.

7. The system of claim 6 in which the backwash water is returned to the system upstream from the distributing valve.

8. The system of claims 6 or 7 in which the filtered water is non-potable water from a sewage treatment plant and is supplied to an underground drip irrigation system.

9. In a sewage treatment system including a septic tank for receiving the sewage initially and through bacterial action reducing the BOD of the effluent as it leaves the tank, the improvement comprising a filter system downstream of the tank through which the effluent flows to filter a sufficient amount of solids out of the effluent to reduce the BOD of the effluent, the filter system comprising two filters, each having a housing and a filter medium located in the housing through which the effluent flows in one direction to be filtered before entering the irrigation system, a distributing valve assembly for alternating the flow of effluent from one to the other of the filters, an effluent discharge line connected to each filter to carry filtered effluent to a line connected to the irrigation system, a pressure regulator in the line to the irrigation system to create a back pressure in the line from the filters to cause a portion of the effluent from the filtering filter to flow through the filter medium of the non-filtering filter and backwash the non-filtering filter.

10. The sewage treatment system of claim 9 further provided with a second tank downstream of the septic tank and upstream of the filter, said tank containing an oxidizing chemical to further reduce the BOD in the effluent upstream of the filter.

11. The sewage system of claim 10 in which the chemical in the second tank is chlorine.

12. The sewage system of claim 10 in which the chemical is ozone.

13. In a sewage treatment system including a septic tank for receiving the sewage initially and through bacterial action reducing the BOD of the effluent as it leaves the tank, the improvement comprising a filter system downstream of the tank through which the effluent flows to filter a sufficient amount of solids out of the effluent to reduce the BOD of the effluent, the filter system comprises two filters, each filter having a cylindrical housing, a cylindrical filter screen mounted in the housing to provide an annular space between the filter and the housing, an inlet in one end of the housing through which effluent enters the screen and is filtered through the walls of the screen into the annular space, a filtered effluent outlet in the housing, a second outlet in the other end of the housing through which unfiltered effluent flows out of the housing, a flow line connecting the filtered effluent outlets of both filters together and to a common filtered effluent line, a pressure regulator in the common filtered effluent flow line to limit the pressure of the filtered effluent provided by the system, and a restriction in the second outlet in the housing of the first filter to restrict the flow of unfiltered effluent from the first filter to maintain the pressure of the filtered effluent sufficient for a portion of the filtered effluent to flow into the annular space between the filter screen and the housing of the second filter to backwash the filter screen in the second filter, and a distributing valve for alternating the flow of effluent to the filters.

14. A filter system for use with a waste water treatment plant to reduce the solids in and the BOD of the effluent from the plant comprising two filters, each filter having a housing, a filter screen mounted in the housing to provide a space between the filter and the housing, an inlet in one end of the housing through which water enters the screen and is filtered through the walls of the screen into the annular space, a filtered water outlet in the housing, a second outlet in the other end of the housing through which unfiltered water flows out of the housing, a flow line connecting the filtered water outlets of both filters together and to a common filtered water line, a pressure regulator in the common filtered water flow line to limit the pressure of the filtered water provided by the system, and a restriction in the second outlet in the housing of the first filter to restrict the flow of unfiltered water from the first filter to maintain the pressure of the filtered water sufficient for a portion of the filtered water to flow into the annular space between the filter screen and the housing of the second filter to backwash the filter screen in the second filter, and means for alternating the flow of water to the filters to alternately backwash each filter as the other is filtering the waste water to reduce the solids in and the BOD of the effluent.

15. The system of claim 14 in which the backwash water is returned to the system upstream of the plant.

16. The system of claim 14 in which the filtered water is supplied to an underground drip irrigation system.

17. In a sewage treatment system including a septic tank for receiving the sewage initially and through bacterial action reducing the BOD of the effluent as it leaves the tank, the improvement comprising a filter system downstream of the tank through which the effluent flows to filter a sufficient amount of solids out of the effluent to reduce the BOD of the effluent, the filter system comprising two filter assemblies, each having a housing and a filter medium located in the housing through which the effluent flows in one direction to be filtered, a distributing valve assembly for alternating the flow of effluent from one to the other of the filter assemblies, an effluent discharge line connected to each filter assembly, a pressure regulator in the line to the irrigation system to create a back pressure in the effluent discharge line from the filters to cause a portion of the effluent from the filtering filter to flow through the filter medium of the non-filtering filter and backwash the non-filtering filter.

18. The sewage treatment system of claim 17 further provided with a tank downstream of the waste water treatment plant and upstream of the filter assemblies, said tank containing an oxidizing agent to further reduce the BOD in the effluent upstream of the filter assemblies.

19. The sewage system of claim 18 in which the chemical in the downstream tank is chlorine.

20. The sewage system of claim 18 in which the chemical in the downstream tank is ozone.

21. In a sewage treatment system including a septic tank for receiving the sewage initially and through bacterial action reducing the BOD of the effluent as it leaves the tank, the improvement comprising a filter system downstream of the tank through which the effluent flows to filter a sufficient amount of solids out of the effluent to reduce the BOD of the effluent, the filter system comprises two filters, each filter having a housing, a filter screen mounted in the housing to provide a space between the filter and the housing, an inlet in one end of the housing through which effluent from the septic tank enters the screen and is filtered through the walls of the screen into the space between the filter and the housing, a filtered effluent outlet in the side of the housing, a second outlet in the housing through which unfiltered effluent flows out of the housing, a flow line connecting the filtered effluent outlets of both filters together and to a common filtered effluent flow line, a pressure regulator in the common filtered effluent flow line to reduce the pressure of the filtered effluent discharged from the system, and a restriction in the second outlet in the housing of the first filter to restrict the flow of unfiltered effluent from the first filter to maintain the pressure of the filtered effluent sufficient for a portion of the filtered effluent to flow into the annular space between the filter screen and the housing of the second filter to backwash the filter screen in the second filter, and a distributing valve for alternating the flow of effluent to the filters.

22. The sewage treatment system of claim 21 further including an underground drip irrigation system into which the effluent from the system flows.

* * * * *